United States Patent [19]

Sugi et al.

[11] Patent Number: 5,223,031
[45] Date of Patent: Jun. 29, 1993

[54] CEMENT/ASPHALT MIXTURES AND PROCESSES FOR PREPARATION OF THE SAME

[75] Inventors: Tomomitsu Sugi, Ashiya; Yutaka Ando, Osaka; Minoru Makita, Tokyo; Akira Ito, Kokubunjimachi, all of Japan

[73] Assignees: Osaka Cement Co., Ltd., Osaka; Nichireki Chemical, Tokyo, both of Japan

[21] Appl. No.: 908,600

[22] Filed: Jun. 30, 1992

Related U.S. Application Data

[63] Continuation of Ser. No. 465,235, Apr. 25, 1990, filed as PCT/JP89/00799, Aug. 3, 1989, abandoned.

[30] Foreign Application Priority Data

Aug. 4, 1988 [JP] Japan .................. 63-195414
Jul. 3, 1989 [JP] Japan .................. 1-171580

[51] Int. Cl.⁵ .............................................. C08L 95/00
[52] U.S. Cl. .................. 106/277; 106/281.1; 106/283; 427/136
[58] Field of Search .............. 106/273.1, 277, 281.1, 106/283; 404/72; 427/136

[56] References Cited

FOREIGN PATENT DOCUMENTS 51-86240 7/1976 Japan .

Primary Examiner—David Brunsman
Attorney, Agent, or Firm—Larson and Taylor

[57] ABSTRACT

The present invention provides: a cement/asphalt mixture comprising an aggregate, an asphalt emulsion, cement, a hydraulic inorganic material and water, characterized in that the surfaces of aggregate fragments are covered with the asphalt particles prepared by the coalescence of asphalt emulsion and that the hydraulic inorganic material and water are present in the interstices between the aggregate fragments; a process for preparing a cement/asphalt mixture, the process being characterized by the steps of adding 2 to 12 parts (in terms of solids content) of a cationic or anionic asphalt emulsion to 100 parts of an aggregate; mixing them; and mixing the resulting mixture with 1 to 20 parts of a hydraulic inorganic material; and a process for preparing a cement/asphalt mixture, the process being characterized by the steps of adding 2 to 12 parts (in terms of solids content) of a cationic or anionic asphalt emulsion to a mixture of 100 parts of an aggregate and 0.1 to 6 parts of an alkaline compound of a bivalent metal; mixing them; and mixing the resulting mixture with 1 to 20 parts of a hydraulic inorganic material.

20 Claims, 1 Drawing Sheet

FIG. 1

CEMENT/ASPHALT MIXTURES AND PROCESSES FOR PREPARATION OF THE SAME

This application is a continuation of application Ser. No. 07/465,235 filed Apr. 25, 1990, filed as PCT/JP89/00799, Aug. 3, 1989, now abandoned.

FIELD OF THE INVENTION

The present invention relates to cement/asphalt mixtures which can be applied at room temperature when used as paving materials for surface courses, binder courses or the like in roads, walk spaces in plants, playgrounds, airports, banks, waterways, reservoirs, etc. and also to processes for preparing the mixtures.

The parts and percentages in the following description are all by weight.

PRIOR ART AND ITS PROBLEMS

Cement/asphalt mixtures composed of cement, an asphalt emulsion and an aggregate are known. The cured bodies of the cement/asphalt mixtures are usable for various applications as base courses in pavements, paved pathways in plants, cast-in-site diaphragm walls, grouts (fillers) or the like. For the cement/asphalt mixtures, an asphalt emulsion (formed with an anionic, cationic or nonionic surfactant as an emulsifier) is used which is excellent in chemical stability to cement and in compatibility with cement. The mixture is applied before the asphalt emulsion coalesces in the mixture. In such conventional methods, the mixture applied is cured due to the coalescence of asphalt emulsion and the hydration reaction of cement to give a cured cement/asphalt body. Consequently a cement/asphalt paste in the mixture serves as a binder for the aggregate in the formation of a cured cement/asphalt body. In other words, among the asphalt particles derived from the asphalt emulsion in the mixture, more asphalt particles are dispersed in the cement paste than those directly attached to the aggregate fragments. Therefore while capable of exhibiting the properties of cement, the cured cement/asphalt body can not fully display the properties of asphalt.

A process for producing cured cement/asphalt bodies has been proposed in which an asphalt emulsion coalesces or decomposes and the asphalt is dispersed in the form of particulate solids. More specifically, Japanese Examined Patent Publication No.48502/1982 discloses a process for producing a cured cement/asphalt body in which 100 parts of cement, 10 to 50 parts (in term of asphalt solids content) of a cationic asphalt emulsion, an aggregate and when required water are kneaded together to form from the asphalt emulsion the particulate solids of asphalt which are eventually dispersed in a cured cement body. The publication describes that according to the process, since the asphalt particles are dispersed in the cured cement/asphalt body, the obtained cured body is improved in flexibility and in skid resistance, and the surface of the cured body has the same color as that of cement and is substantially free of flush of asphalt even in the presence of large amount of asphalt.

The asphalt, however, is also dispersed as the particulate solids even in the cured cement/asphalt body according to the process and the cement paste acts as a binder for the particulate solids and the aggregate to form a cured cement/asphalt body. In other words, the asphalt particulate solids and the aggregate fragments in the cured body are covered with the cement paste. Therefore the cured cement/asphalt body exhibits the properties of cement but not fully the properties of asphalt as in case of the cured body of the abovementioned cement/asphalt mixture.

The foregoing conventional cured cement/asphalt bodies are superior in strength but inferior in flexibility, durability and the like to the cured bodies formed from common hot-laid asphalt mixtures.

On the other hand, hot-laid asphalt mixtures can form cured bodies excellent in flexibility, durability and the like but needs substantial improvements in the properties in view of the recent road situation. Stated more specifically, an increasing traffic volume of heavy vehicles in recent years tends to cause rutting in the surface course and base course of asphalt pavements, surface irregularities, deteriorated surface smoothness, flow phenomena, etc. As a preventive measure, improved asphalts have been increasingly used which include modified asphalts containing rubber and/or a synthetic polymeric substance to improve the consistency, adhesion, durability and the like, and asphalts of higher consistency than conventional asphalts useful for pavements. These asphalts, however, are not fully satisfactory in dynamic stability to traffic loads at high temperatures in summertime. Further improvements are ardently desired.

Means for Overcoming the Problems

The present inventors have conducted extensive research in view of the above-mentioned state of the art and have found that a cement/asphalt mixture of novel structure wherein the asphalt particles not independently exist but cover the aggregate surfaces can substantially obviate or can significantly alleviate the drawbacks of conventional cement/asphalt mixtures and conventional hot-laid asphalt mixtures.

According to the present invention, there are provided:

(1) a cement/asphalt mixture comprising an aggregate, an asphalt emulsion, cement, a hydraulic inorganic material and water, characterized in that the surfaces of aggregate fragments are covered with the asphalt particles prepared by the coalescence or decomposition of asphalt emulsion and that the hydraulic inorganic material and water are present in the interstices between the aggregate fragments;

(2) a process for preparing a cement/asphalt mixture, the process being characterized by th steps of adding 2 to 12 parts (in terms of solid content) of a cationic or anionic asphalt emulsion to 100 parts of an aggregate; mixing them; and mixing the resulting mixture with 1 to 20 parts of a hydraulic inorganic material (hereinafter referred to, when necessary, as "first process"), and (3) a process for preparing a cement/asphalt mixture, the process being characterized by the steps of adding 2 to 12 parts (in terms of solid content) of a cationic or anionic asphalt emulsion to a mixture of 100 parts of an aggregate and 0.1 to 6 parts of an alkaline compound of a bivalent metal; mixing them; and mixing the resulting mixture with 1 to 20 parts of a hydraulic inorganic material (hereinafter referred to, when necessary, as "second process").

Aggregates useful in the invention include those identical in properties and particle size with those commonly employed for asphalt pavements. That is, coarse aggregates or fine aggregates are used in the invention according to a particular application and if required a filler may be conjointly used. The term "coarse aggregate" used herein refers to aggregate fragments which remain on a sieve having openings of 2.5 mm diameter, and the term "fine aggregate" used herein to aggregate fragments which pass through a sieve having openings of 2.5 mm diameter but remain on a sieve with openings of 0.074 mm diameter, according to the "Manual for Design and Construction of Asphalt Pavements" published by Japan Road Association. The term "filler" used herein means aggregate fragments which pass through a sieve with openings of 0.074 mm diameter.

Examples of common coarse and fine aggregates are crushed stone, crusher-run, screenings, crushed stone dust, blast-furnace slag, sand, etc. Also usable are luxvite, artificial calcined aggregates, aluminum powder, pottery powder, colored aggregates and like light-colored aggregates; emery, silica sand and like hard aggregates; sirsu balloon, pearlite, silica balloon and like calcined foamed aggregates or artificial lightweight aggregates; and aggregates recovered from waste asphalt pavements or asphalt-coated crushed stone.

Examples of useful fillers are fillers from screenings, stone powders, incineration ash, clay, talc, flyash, etc.

Asphalt emulsions are classified in cationic, anionic and nonionic ones and the like depending on the kind of surfactants used as an emulsifier. Asphalt emulsions used in the present invention as admixed directly with the aggregate are cationic or anionic. Nonionic asphalt emulsions fail to cause the asphalt to adhere to the aggregate as desired and thus are not usable in the invention for mixing directly with the aggregate. Examples of cationic and anionic asphalt emulsions useful in the invention are natural asphalt, straight asphalt, blown asphalt, semi-blown asphalt, solvent extracted asphalt (e.g. propane extracted asphalt) and like petroleum asphalts, and oil-in-water type asphalt emulsions prepared by emulsifying or dispersing in water at least one of modified asphalts comprising a mixture of the petroleum asphalt, rubber, polymer and the like in the presence of an emulsifier, a dispersant, a stabilizer or the like. Asphalts having a penetration (25° C.) of about 40 to about 500 are desirable to use in view of the properties of cured bodies. While asphalt emulsions commonly employed have a residual asphalt content (in terms of solid content) of about 50 to about 70%, the asphalt emulsion of the invention is not specifically limited in respect of the concentration. Asphalt emulsions useful in the invention may contain a rubber latex, synthetic polymer latex, synthetic polymer emulsion, water-soluble synthetic resin, reactive water-soluble or emulsified synthetic resin, curing agent therefor or the like when so desired insofar as they do not inhibit the bonding reaction between the asphalt emulsion and the aggregate. The use of such additives gives improved properties to cured cement/asphalt body. The amount of asphalt emulsion (containing additives if any) used in the invention is usually about 2 to about 12 parts, preferably about 4 to about 10 parts, per 100 parts of the aggregate, calculated as solids. Less than 2 parts of asphalt emulsion fails to fully exhibit the effect derived from asphalt, giving a reduced flexibility to the cured cement/asphalt body, whereas more than 12 parts of asphalt emulsion decreases the stability of cured cement/asphalt body. In case of decrease in stability of cured body, an increased amount of hydraulic material is required, hence economically disadvantageous.

Examples of hydraulic inorganic materials useful in the present invention are cement, anhydrous gypsum, hemihydrate gypsum, powdered slag and the like. Examples of useful cements are normal Portland cement, high-early-strength Portland cement, ultrahigh-early-strength Portland cement, moderate heat Portland cement, white Portland cement, blast furnace Portland cement, silica cement, flyash cement, alumina cement, expansive cement, anti-sulfate cement, super rapid cement, blast furnace colloidal cement, colloidal cement, etc. The amount of hydraulic inorganic material used is usually about 1 to about 20 parts, preferably about 3 to about 18 parts, per 100 parts of the aggregate. The amount of less than 1 part reduces the stability of the cured cement/asphalt body, whereas the amount exceeding 20 parts gives excessive strength and rigidity to the cured cement/asphalt body, rendering the cured body non-flexible. When required, water, an asphalt emulsion, known additives for cement (e.g. shrinkage reducing agent, curing accelerator, curing retardant, dispersant, air-entraining agent, thickener, water reducing agent and filler) and the like can be used in combination with the hydraulic inorganic material. Nonionic asphalt emulsions may be used instead of the cationic or anionic asphalt emulsions.

Examples of useful fillers are glass powders, iron powders, metal powders, pigments (red iron oxide, titanium oxide, zinc flower, chromium oxide, chrome yellow, yellow ochre, etc.), extenders (barytes, etc.), organic pigments (lake pigment, etc.), inorganic or organic monofilaments (glass fibers, ceramic fibers, carbon fibers, synthetic fibers, metallic fibers, aramide fibers, etc.), polymeric materials (rubber latexes, polymeric latexes, synthetic latex emulsions, water-soluble synthetic polymers, reactive water-soluble synthetic polymers, reactive synthetic polymer emulsions and curing agents therefor) and the like. Useful fillers are selected from them in accordance with the use of cement/asphalt mixture. For example, pigments are used when a cured cement/asphalt body needs to be colored. Monofilaments are used as a reinforcing agent for improving the strength of cured cement/asphalt body. Rubber latexes, synthetic polymeric latexes or synthetic polymer emulsions are used to improve the flexibility of cured cement/asphalt body.

The alkaline compound of a bivalent metal for use in the second process of the invention has activities to activate the aggregate surface and to coalesce the asphalt emulsion. With such activities the alkaline compound accelerates the bonding reaction between the aggregate and the asphalt emulsion as mixed therewith, thereby further promoting the adhesion of asphalt particles to the aggregate surface. The term "alkaline compound of a bivalent metal" used herein refers to the compound having as a chief component a compound containing an alkaline earth metal or an oxide thereof. Examples of useful alkaline compounds of bivalent metals (hereinafter referred to as decomposition accelerators) are as follows.

Oxides: CaO, MgO, etc.
Hydroxides: $Ca(OH)_2$, $Mg(OH)_2$, etc.
Cements: those comprising as essential components at least one of calcium silicate, calcium aluminate, calcium sulfate, calcium oxide and the like such as normal Portland cement, high-early-strength Portland cement, ultrahigh-early-strength Portland cement, moderate heat Portland cement, white Portland cement, blast furnace Portland cement, silica cement, flyash cement, alumina cement, expansive cement, anti-sulfate cement, super rapid cement, blast furnace colloidal cement, colloidal cement and the like.

These decomposition accelerators are usable singly or at least two of them can be used in mixture.

The amount of decomposition accelerator used per 100 parts of the aggregate is variable depending on the kind of the aggregate, the kind of the decomposition accelerator itself, the composition of the asphalt emulsion and the like, and usually ranges from about 0.1 to about 6 parts. When below 0.1 part of the decomposition accelerator is used, the aggregate surface is not satisfactorily activated or the asphalt emulsion is not fully coalesced. Reversely, more than 6 parts of the decomposition accelerator used tends to reduce the adhesion of the asphalt to the aggregate and the coating properties thereof.

The cement/asphalt mixture to be formed according to the first process of the invention is usually prepared by executing the following procedures of A-I to A-II.

A-I. A cationic or anionic asphalt emulsion is added to the aggregate and the mixture is stirred by a mixer usually for about 10 to about 60 seconds. Then the asphalt emulsion coalesces on the aggregate surface and the asphalt particles gradually adhere to the aggregate, whereby an asphalt film is formed, resulting in blackening of aggregate surfaces. When the operation is conducted in wintertime or at a cold climate, the aggregate may be heated to a temperature of lower than 120° C. to accelerate the coalescence of asphalt emulsion. Although heating is unnecessary under usual conditions, the aggregate, of course, can be heated if desired. In case the aggregate has been preheated or the bonding reaction has rapidly proceeded under optimal conditions, the reaction may have been almost completed when the stirring terminates. When the mixture is stirred at room temperature, it may take about 5 to about 6 minutes until completion of bonding reaction after stirring and blackening of aggregate by coating with the asphalt. In conjoint use of at least two kinds of aggregates differing from each other in particle size, for example a coarse aggregate and a fine aggregate in combination, preferably an asphalt emulsion is added to and mixed with the coarse aggregate first, and then the fine aggregate and the asphalt emulsion are added, followed by continued mixing. Alternatively the fine aggregate and asphalt emulsion may be mixed together first, and then the coarse aggregate and asphalt emulsion may be added for further mixing. When the asphalt emulsion is added dividedly, a coating of multiple thin asphalt films is formed on the aggregate fragments, whereby a great advantage is obtained in that the adhesion of asphalt to the aggregate is made uniform and more firm. At the time of completion of this reaction, a mixture has been formed which is substantially composed of the water derived from the asphalt emulsion and the black aggregate coated with the asphalt.

A-II. Subsequently a hydraulic inorganic material and when required water, asphalt emulsion, additives and the like are added to the mixture of the water and the aggregate covered with the asphalt. Then mixing is conducted by a mixer, giving a cement/asphalt mixture according to the invention. Although sufficient mixing is usually accomplished in about 30 to about 60 seconds, the mixing may continue for a longer period of time, if necessary. In use of water, asphalt emulsion, additives for cement and the like, they may be premixed with a hydraulic inorganic material, or added and mixed concurrently with, or before or after, the addition of hydraulic inorganic material. The water content of cement/asphalt mixture derived only from the water of asphalt emulsion is usually sufficient. However, an asphalt emulsion and/or water can be suitably supplied whenever needed in case the water content derived therefrom is not sufficient, for example, to hydrate the hydraulic inorganic material, to use additives, fillers and the like, or to adjust the viscosity for assured work efficiency. For supply, water and/or an asphalt emulsion can be added and mixed after the formation of cement/asphalt mixture.

The cement/asphalt mixture to be formed according to the second process of the invention is usually prepared by conducting the following procedures of B-I to B-III.

B-I. First, an aggregate and a decomposition accelerator (an alkaline compound of a bivalent metal) are mixed together by a mixer such as a pugmill mixer. When the operation is conducted in wintertime or at a cold climate, the aggregate may be heated to a temperature not exceeding 120° C. to accelerate the coalescence of the asphalt emulsion described below. Although heating is not needed under usual conditions, heating, of course, may be performed.

B-II. Subsequently a cationic or anionic asphalt emulsion is added to the mixture, and mixing is conducted by a mixer usually for about 10 to about 60 seconds. The asphalt emulsion is coalesced on the aggregate surfaces and the asphalt particles gradually adhere to the aggregate fragments, whereby an asphalt film is formed thereon, resulting in blackening of the aggregate surfaces. In case the aggregate has been preheated or the bonding reaction has rapidly proceeded under optimal conditions, the reaction may have been almost completed when the stirring terminates. In mixing and stirring at room temperature, it may require about 5 to about 6 minutes until the completion of bonding reaction after stirring and blackening of aggregate by coating with the asphalt. At the time of completion of this reaction, a mixture substantially composed of the water derived from the asphalt emulsion and the black aggregate covered with the asphalt has been formed.

B-III. Subsequently a hydraulic inorganic material and, when required, water, asphalt emulsion, additives and the like are added to the mixture of the water and the aggregate covered with the asphalt. Mixing is conducted by a mixer, giving a cement/asphalt mixture according to the present invention. Although sufficient mixing is usually obtained in about 30 to about 60 seconds, the mixing may continue for a longer period of time, if necessary. The asphalt film formed on the aggregate surfaces is further firmly adhered to the aggregate by this longer mixing. In case of using water, asphalt emulsion, additives for cement and the like, they may be premixed with a hydraulic inorganic material, or added and mixed concurrently with, before or after, the addition of hydraulic inorganic material. The water content of cement/asphalt mixture derived only from the water of the asphalt emulsion is usually sufficient. However, an asphalt emulsion and/or water can be suitably supplied whenever needed in case the water content derived therefrom is not sufficient, for example, to hydrate the hydraulic inorganic material, to use additives and the like, or to adjust the viscosity for assured work efficiency. Water and/or an asphalt emulsion can be added and mixed after the formation of cement/asphalt mixture.

According to the present invention, mixing needs to be done in the order of A-I to A-II or B-I to B-III. If the mixing is not performed in this specific order, it is impossible to form the cement/asphalt mixture which is structurally unique in that the asphalt adheres uniformly to the aggregate surface, even in using the same materials as in the invention. In other words, the cement/asphalt mixture of the invention contains aggregate fragments with surfaces blackened due to the asphalt coating adhered uniformly thereto and is clearly and readily distinguishable in this regard from cement/asphalt mixtures prepared by processes other than those of the present invention, the aggregate and the asphalt in such mixtures being present separately.

The cement/asphalt mixtures of the present invention will be described below in greater detail with reference to the drawings.

Figure 1:
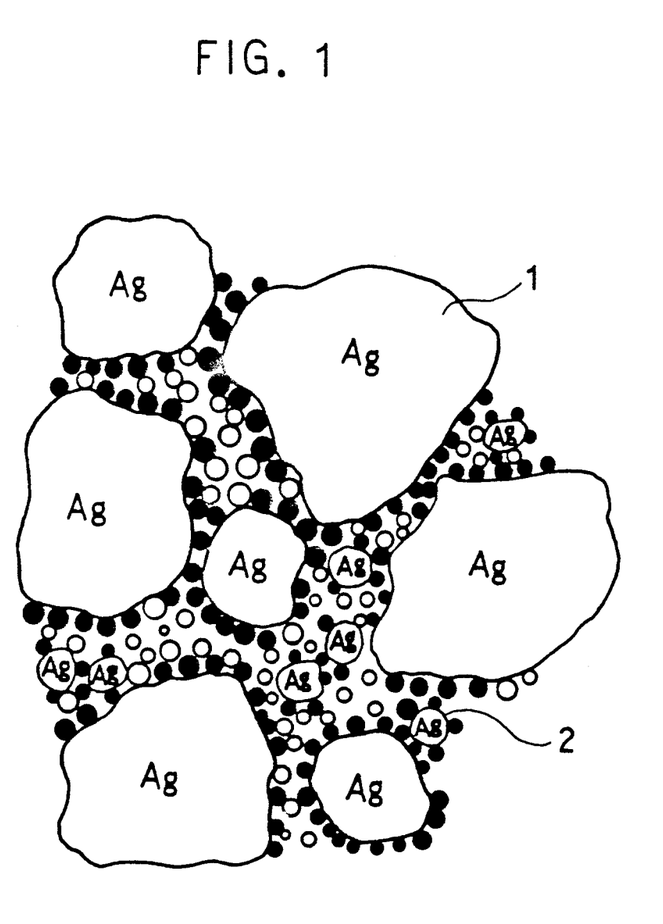
FIG. 1 is a schematic diagram showing the structure of the cement/asphalt mixture prepared by the processes of the present invention.

FIG. 1 shows that the asphalt particles represented by circular black dots uniformly adhere to and substantially entirely cover the surfaces of both coarse aggregate fragments (1) and fine aggregate fragments (2). The coarse aggregate fragments (1) and the fine aggregate fragments (2) form a mixture together with the hydraulic inorganic material represented by circular white dots and a small amount, about 0.01 to about 10 parts (per 100 parts of the aggregate), of water (not shown) both present in the interstices between the aggregate fragments.

Depending on the proportion of each material and the like, the properties of the cement/asphalt mixture of the invention can vary widely from very low consistency to very good slump including slight slump. Although the working life (during which the mixture remains workable and applicable) of the cement/asphalt mixture according to the present invention can be controlled by varying the proportion of each material and the like, it is usually desirable to adjust the working life to about 2 hours in view of all factors such as the time required for transporting and applying the cement/asphalt mixture and a request for early opening to traffic after formation of a cement/asphalt cured body as a road. Needless to say, the working life of the cement/asphalt mixture is suitably variable according to differences in the conditions for application of mixture and the situation in use thereof.

In the same manner as known asphalt mixtures, the cement/asphalt mixture of the invention is applied onto the road pavement already laid (e.g. asphalt concrete pavements, cement concrete pavements, etc.), or onto the surface course, binder course or base course of pavements and the like. A detail description is omitted on paving methods, equipment and the like required for the cement/asphalt mixtures of the invention, since these conditions little differ from those for known asphalt mixtures except that a need for heating is eliminated.

Further, the cement/asphalt mixture of the invention is outstanding in stability, plastic flow resistance and the like and thus particularly suitable as paving materials for pavements in intersection areas, bus terminals, truck terminals, container yards, turnpike tollhouse areas, the surface of highway bridges, etc. which are subjected to severe traffic conditions.

Furthermore, the cement/asphalt mixtures of the invention are useful as paving materials for surface courses, binder courses and the like in not only roads but also passages of plants, playgrounds, airports, banks, waterways, reservoirs, etc.

ADVANTAGES OF THE INVENTION

According to the present invention, the following remarkable results can be achieved.

(a) Since the cement/asphalt mixtures of the invention can be prepared at room temperature using the minimum amount of water required to hydrate the hydraulic inorganic material, the facilities and procedures can be simplified and stable-quality products can be easily produced.

(b) The cement/asphalt mixtures prepared by mixing the starting materials in the specific orders according to the processes of the invention have the unique structure in which the aggregate surfaces are uniformly and securely covered with the asphalt particles and the hydraulic inorganic material and water are present in the interstices between the aggregate fragments.

(c) The working life of the cement/asphalt mixtures is controllable in any season by changing, e.g. kinds and proportions of the starting materials used.

(d) Since the obtained cement/asphalt mixtures need not be heated, all procedures required from application of the mixture to construction of a pavement can be executed at room temperature with high work efficiency. Therefore the asphalt is free of heat deterioration and can exhibit the desired bonding power due to rolling in a living state.

(e) The obtained cement/asphalt mixtures are easy to handle, shovel and transport on a dump truck.

The cement/asphalt mixtures are also spreadable over a road surface into a compact, uniform layer employing a conventional asphalt finisher, rake or the like.

(f) The cement/asphalt mixtures can be formed into an excellent pavement by rolling for compaction on spreading before the curing of hydraulic inorganic material has advanced (i.e. within the working life).

Usable for compaction are a conventional macadam roller, pneumatic tired roller, tandem roller, vibrating roller and like rollers, plate compactor, tamper and the like. Alternatively the compaction may be attained after heating of layer surface on spreading of cement/asphalt mixture.

(g) During compaction by rolling, the aggregate fragments covered with asphalt particles in the cement/asphalt mixture are adhered and bonded to each other by the bonding power of the asphalt. More specifically, the asphalt particles covering the aggregate fragments contain portions of a decomposition accelerator, hydraulic inorganic material and the like. However, unlike hot-laid asphalt mixtures, the asphalt in the mixture of the invention is not deteriorated by heat during the producing process and remains in a living state during the working life so that the aggregate fragments are directly bonded to each other, rendering the cement/asphalt mixture significantly stable. Further, the small water content in the cement/asphalt mixture is among the factors responsible for satisfactory compaction by rolling.

(h) The cement/asphalt mixture of the invention, significantly stabilized by rolling and compaction and by the bonding power of the asphalt, is imparted a further increased stability by the hydration reaction of hydraulic inorganic material, eventually forming a cured body with a markedly high stability.

Furthermore the pavement surface of higher stability can be produced by applying a seal coat after rolling during the paving process.

(i) The cured body (cured cement/asphalt body) obtained from the cement/asphalt mixture of the invention is as flexible as cured bodies of hot-laid asphalt mixtures and is far higher in Marshall stability, dynamic stability and the like than cured bodies of hot-laid asphalt mixtures.

The stability of cured cement/asphalt body of the invention unlike cured bodies of hot-laid asphalt mixtures can be changed according to its particular use.

(j) The cured cement/asphalt body of the invention is kept free of flush of asphalt and has a high skid resistance.

(k) Even when an increased amount of asphalt is used in the invention, the use of correspondingly increased amount of hydraulic inorganic material provides a cured cement/asphalt body with enhanced stability after the curing thereof and thus a cured body excellent in wear resistance, durability and the like.

(l) When used for pavement of a slope, the cured cement/asphalt body of the invention with a high stability is not softened even by exposure to perpendicularly falling rays of sunlight unlike cured bodies of hot-laid asphalt mixtures.

(m) While it is impossible for conventional cured cement/asphalt bodies to prevent shrinkage crack due to the presence of hydraulic inorganic material, shrinkage crack can be substantially completely precluded in the cured cement/asphalt body of the invention.

EXAMPLES

The features of the present invention will be further clarified below with reference to the following Examples.

EXAMPLE 1

A mixer was charged with 44 parts of crushed stone No.6 and 24 parts of crushed stone No.7. While mixing them, 10 parts of a quick-curing cationic asphalt emulsion for mixing (product of Nichireki Chemical Industry Co., Ltd., residual asphalt content 58%) was added dividedly in amounts of 1 part, 5 parts and 4 parts. Mixing continued for about 10 seconds in each addition.

A 30 part quantity of screenings was added and mixing followed for about 10 seconds. To the thus obtained aggregate-asphalt emulsion mixture was added a homogeneous mixture of 4 parts of a ultrahigh-early-strength Portland cement (product of Osaka Cement Co., Ltd.) and 2 parts of a filler. After mixing for about 20 seconds, 0.5 part of water was added and further mixing continued for about 10 seconds.

The obtained cement/asphalt mixture was subjected to impact compaction on both sides, 50 times on each side, at room temperature to produce a test specimen for Marshall stability test. The test specimen was cured at room temperature (about 20° C.) for 3 days and subjected to Marshall stability test according to a common method (immersion in water at 60° C. for 30 minutes).

The results showed that test specimen had a density of 2.30 g/cm$^3$, a Marshall stability of 1,550 kgf and a flow value (1/100 cm) of 25.

Further the obtained cement/asphalt mixture was subjected to rolling for compaction with a roller compacter to produce a test specimen measuring 30 cm×30 cm×5 cm. The rolling for compaction was easily performed. The test specimen was withdrawn from the mold on rolling for compaction and cured at room temperature (about 20° C.) for 3 days. The test specimen was subjected to the wheel tracking test described in "Manual for Paving Test Method" at a temperature of 60° C. under a load (contact pressure) of 6.4±0.15 kgf/cm$^2$. The test specimen had a density of 2.31 g/cm$^3$ and a dynamic stability (DS) of 12,000 pass/mm.

The obtained cement/asphalt mixture was actually used for construction of a pavement.

A rapid-setting cationic asphalt emulsion (product of Nichireki Chemical Industry Co., Ltd.) was applied in an amount of 0.3 l/m$^2$ to the surface of a concrete pavement to form a primer coat thereon. The above-obtained cement/asphalt mixture was spread over the primer coat in an amount of about 120 kg/m$^2$ using an asphalt finisher and subjected to rolling for compaction with a roller. The cement/asphalt mixture was supplied by a dump truck to the asphalt finisher as usually done for hot-mixed asphalt. The rolling for compaction was conducted with a macadam roller, a tire roller and a tandem roller. The result of compaction was satisfactory.

EXAMPLE 2 AND COMPARISON EXAMPLE 1

A mixer was charged with 40 parts of crushed stone No.6 and 20 parts of crushed stone No.7. While mixing them, 7 parts of a quick-curing cationic asphalt emulsion for mixing (product of Nichireki Chemical Industry Co., Ltd., residual asphalt content 58%) was added dividedly in amounts of 1 part, 3 parts and 3 parts. Mixing continued for about 10 seconds in each addition.

A 23 part quantity of sand was added and mixing followed for about 10 seconds. Three parts of the above asphalt emulsion was added and mixing followed for about 10 seconds. Then 15 parts of screenings was added and mixing continued for about 10 seconds.

To the thus obtained aggregate-asphalt emulsion mixture was added a homogeneous mixture of 5 parts of ultrahigh-early-strength Portland cement (product of Osaka Cement Co., Ltd.) and 2 parts of a filler. After mixing for about 20 seconds, 1 part of water was added and mixing continued for about 15 seconds.

The thus obtained cement/asphalt mixture had very low consistency, was easy to handle and facilitated operations such as transporting on a dump truck and spreading with an asphalt finisher. The working life of the mixture was at least about 2 hours.

A test specimen for Marshall stability test was prepared from the obtained cement/asphalt mixture, cured and subjected to Marshall stability test in the same manner as in Example 1.

The results showed that test specimen had a density of 2.31 g/cm$^3$, a Marshall stability of 1,900 kgf and a flow value (1/100 cm) of 23.

Another test specimen was produced from the obtained cement/asphalt mixture, cured and subjected to wheel tracking test in the same manner as in Example 1. The test specimen had a density of 2.33 g/cm$^3$ and a dynamic stability (DS) of 15,000 pass/mm.

A mixture of 100 parts of heated aggregate of the type used in Example 2 and 5.8 parts of straight asphalt (penetration 60/80) was subjected to the same Marshall stability test and wheel tracking test as above (Comparison Example 1). The results of Marshall stability test were a density of 2.36 g/cm$^3$, a Marshall stability of 1,420 kgf and a flow value (1/100 cm) of 30. The results of wheel tracking test were a density of 2.37 g/cm³ and a dynamic stability (DS) of 510 pass/mm.

The comparison of Example 2 and Comparison Example 1 showed that the cured cement/asphalt body of the invention had a Marshall stability 1.34 times that of cured bodies of hot-laid asphalt mixtures. Further the cured cement/asphalt body of the invention was close in flow value to cured bodies of hot-laid asphalt mixtures and apparently excellent in flexibility. Moreover the cured cement/asphalt body of the invention had a dynamic stability about 30 times that of cured bodies of hot-laid asphalt mixtures, exhibiting a high stability to traffic load and an excellent plastic flow resistance.

EXAMPLE 3

A cement/asphalt mixture was obtained in the same manner as in Example 1 with the exception of (a) using an anionic asphalt emulsion for mixing with a dense-graded aggregate (product of Nichireki Chemical Industry Co., Ltd., residual asphalt content 59%) as an asphalt emulsion and (b) adding 2 parts of SBR latex (product of Nippon Latex Co., Ltd., solids content 50%) in place of water after addition and mixing of a cement-filler mixture, followed by mixing for about 20 seconds.

Using the obtained cement/asphalt mixture, a test specimen for Marshall stability test was prepared, cured and subjected to Marshall stability test in the same manner as in Example 1.

The test specimen had a density of 2.35 g/cm³, a Marshall stability of 1,410 kgf and a flow value (1/100 cm) of 30.

Using the obtained cement/asphalt mixture, a test specimen was prepared, cured and subjected to wheel tracking test in the same manner as in Example 1. The test specimen had a density of 2.35 g/cm³ and a dynamic stability (DS) of 9,100 pass/mm.

The results show that the cement/asphalt mixture obtained in this example was similar in properties to the cement/asphalt mixture obtained in Example 1.

EXAMPLE 4

A mixer was charged with 44 parts of crushed stone No.6 and 24 parts of crushed stone No.7. While mixing them, 8 parts of a quick-curing cationic asphalt emulsion for mixing (product of Nichireki Chemical Industry Co., Ltd., residual asphalt content 58%) was added to the mixture dividedly in amounts of 1 part, 4 parts and 3 parts. Mixing continued for about 10 seconds in each addition. A 30 part quantity of screenings was added and mixing followed for about 10 seconds. To the mixture was added a homogeneous mixture of 4 parts of ultrahigh-early-strength Portland cement (product of Osaka Cement Co., Ltd.) and 2 parts of a filler. After mixing for about 20 seconds, 3 parts of a nonionic asphalt emulsion for mixing with cement (product of Nichireki Chemical Industry Co., Ltd.) was added and mixing followed for about 20 seconds.

A test specimen for Marshall stability test was produced by subjecting the obtained cement/asphalt mixture to impact compaction on both sides, 50 times on each side, at room temperature. The test specimen was cured at room temperature (about 20° C.) for 3 days and subjected to Marshall stability test according to a common method (immersion in water at 60° C. for 30 minutes).

The test specimen had a density of 2.32 g/cm³, a Marshall stability of 1,330 kgf and a flow value (1/100 cm) of 28.

The obtained cement/asphalt mixture was subjected to rolling for compaction with a roller compacter to produce a test specimen measuring 30 cm×30 cm×5 cm. The rolling for compaction was easily performed. The test specimen was withdrawn from the mold on rolling for compaction and cured at room temperature (about 20° C.) for 3 days. The test specimen was subjected to the wheel tracking test described in "Manual for Paving Test Method" at a temperature of 60° C. under a load (contact pressure) of 6.4±0.15 kgf/cm². The test specimen had a density of 2.32 g/cm³ and a dynamic stability (DS) of 8,700 pass/mm.

EXAMPLE 5

Slaked lime was used as a decomposition accelerator in case the asphalt emulsion was extremely slow in decomposition at low temperatures.

A mixer was charged with 44 parts of crushed stone No.6 and 24 parts of crushed stone No.7. One part of a quick-curing cationic asphalt emulsion for mixing (product of Nichireki Chemical Industry Co., Ltd., residual asphalt content 58%) was added and mixing followed for about 10 seconds. A 0.5 part quantity of slaked lime was added and mixing followed for about 10 seconds. A 5 part quantity of the asphalt emulsion was added and mixing continued for about 20 seconds. The mixing was terminated and the mixture was left to stand to allow the asphalt emulsion to coalesce. About 5 minutes thereafter, the aggregate surface became black and the mixing was resumed when the water was separated. Four parts of the asphalt emulsion was added as done as described above and mixing followed for about 10 seconds. A 30 part quantity of screenings was added and mixing continued for about 10 seconds. The same subsequent procedure as in Example 1 was conducted, giving a cement/asphalt mixture.

The same Marshall stability test as in Example 1 was conducted using the obtained cement/asphalt mixture. The test specimen had a density of 2.28 g/cm³, a Marshall stability of 1,480 kgf and a flow value (1/100 cm) of 25.

The obtained cement/asphalt mixture was formed into a test specimen in the same manner as in Example 1. The test specimen was subjected to wheel tracking test, and was found to have a density of 2.29 g/cm³ and a dynamic stability (DS) of 10,500 pass/mm.

EXAMPLE 6

In case an asphalt emulsion slowly coalesced at a low temperature of about 5° to about 10° C., a heated aggregate was used to accelerate the decomposition of asphalt emulsion.

A mixer was charged with crushed stone No.6 and No.7 preheated to about 80° C. and a cement-asphalt mixture was prepared in the same manner as in Example 1.

The same Marshall stability test as in Example 1 was performed using the obtained cement/asphalt mixture. The test specimen had a density of 2.30 g/cm³, a Marshall stability of 1,520 kgf and a flow value (1/100 cm) of 27.

Another test specimen was prepared in the same manner as in Example 1 from the obtained cement/asphalt mixture and subjected to wheel tracking test. The test specimen had a density of 2.29 g/cm³ and a dynamic stability (DS) of 11,400 pass/mm.

EXAMPLE 7

The cement/asphalt mixture obtained in the same manner as in Example 1 was actually used for construction of a pavement. To remove the surface roughness possibly occurring on the pavement, a heater planer was used for rolling to provide a compact surface.

To the surface of concrete pavement was applied a rapid-setting cationic asphalt emulsion (product of Nichireki Chemical Industry Co., Ltd.) in an amount of 0.3 l/m² to form a primer coat thereon. The cement/asphalt mixture was spread thereover in an amount of about 120 kg/m² with an asphalt finisher.

The road surface was heated to about 80° C. by a heater planer, and immediately subjected to rolling for compaction with a roller.

The rolling for compaction gave a good result and a compact finish to the road surface and no surface roughness was found after the road was opened to traffic.

EXAMPLE 8

A pugmill mixer was charged with 100 parts of dense-graded aggregate comprising a mixture of crushed stone No.6 and No.7 and screenings (maximum particle size of up to 20 mm, 5% particles passing through sieve openings of 0.074 mm) and 1 part of ultrahigh-early-strength Portland cement (product of Osaka Cement Co., Ltd.). After mixing for 10 seconds, 14.8 parts of a quick-curing cationic asphalt emulsion for mixing (product of Nichireki Chemical Industry Co., Ltd., residual asphalt content 58%, penetration of residual asphalt (25° C.)=78 (unit=1/10 mm)) was added and mixing followed for about 20 seconds. The mixing was terminated and the mixture was left to stand to allow the asphalt emulsion to coalesce. About 5 minutes thereafter, the aggregate surface became black and the mixing was resumed when the water was separated. A 11 part quantity of the above ultrahigh-early-strength Portland cement was added and mixing continued for about 30 seconds.

The thus obtained cement/asphalt mixture was very low in consistency and easy to handle and facilitated operations such as transporting on a dump truck and spreading with an asphalt finisher. The working life of the mixture was at least about 2 hours.

A test specimen for Marshall stability test was produced by subjecting the obtained cement/asphalt mixture to impact compaction on both sides, 50 times on each side, at room temperature. The test specimen was cured at room temperature (about 20° C.) for 3 days and subjected to Marshall stability test according to a common method (immersion in water at 60° C. for 30 minutes).

The test specimen had a density of 2.34 g/cm³, a Marshall stability of 2,600 kgf and a flow value (1/100 cm) of 28.

The obtained cement/asphalt mixture was subjected to rolling for compaction with a roller compacter to give a test specimen measuring 30 cm×30 cm×5 cm. The rolling for compaction was easily performed. The test specimen was withdrawn from the mold on rolling for compaction, and cured at about 20° C. for 3 days. The test specimen was subjected to the wheel tracking test described in "Manual for Paving Test Method" at a temperature of 60° C. under a load (contact pressure) of 6.4±0.15 kgf/cm². The test specimen had a density of 2.31 g/cm³ and a dynamic stability (DS) of 6,250 pass/mm.

EXAMPLE 9 AND COMPARISON EXAMPLE 2

A pugmill mixer was charged with 100 parts of a dense-graded aggregate comprising a mixture of 42 parts of crushed stone No. 6, 16 parts of crushed stone No. 7 and 42 parts of screenings (maximum particle size of up to 20 mm, 6% particles passing through sieve openings of 0.074 mm) and 1 part of ultra-early-strength Portland cement (product of Osaka Cement Co., Ltd.). Mixing followed for 10 seconds. To the mixture was added 11 parts of a quick-curing cationic asphalt emulsion for mixing (product of Nichireki Chemical Industry Co., Ltd., residual asphalt content 58%, penetration of residual asphalt (25° C.)=78 (unit =1/10 mm)). Further mixing continued for about 20 seconds. The mixing was terminated and the mixture was left to stand to allow the asphalt emulsion to coalesce. About 5 minutes thereafter, the aggregate surface became black and the mixing was resumed when the water was separated. A 5 part quantity of the ultra-early-strength Portland cement was added and mixng continued for about 40 seconds.

The thus obtained cement/asphalt mixture had very low consistency, was easy to handle and facilitated operations such as transporting on a dump truck and spreading with an asphalt finisher. The working life of the mixture was at least about 2 hours.

Using the obtained cement/asphalt mixture, a test specimen for Marshall stability test was produced, cured, and subjected to Marshall stability test in the same manner as in Example 8.

The test specimen had a density of 2.32 g/cm³, a Marshall stability of 2,460 kgf and a flow value (1/100 cm) of 28.

Using the obtained cement/asphalt mixture, a test specimen was produced, cured and subjected to wheel tracking test in the same manner as in Example 8. The test specimen had a density of 2.30 g/cm³ and a dynamic stability (DS) of 5,750 pass/mm.

The same Marshall stability test and wheel tracking test as above were performed using a mixture comprising 100 parts of a heated aggregate of the type as used in Example 9 and 5.5 parts of straight asphalt (penetration, 60/80) in Comparison Example 2. The results of Marshall stability test were a density of 2.39 g/cm³, a Marshall stability of 1,400 kgf and a flow value (1/100 cm) of 31. The results of wheel tracking test were a density of 2.37 g/cm³ and a dynamic stability (DS) of 560 pass/mm.

The comparison of Example 9 and Comparison Example 2 indicated that the cured cement/asphalt body of the present invention had a Marshall stability 1.75 times that of cured bodies of hot-laid asphalt mixtures. Moreover, the cured cement/asphalt body of the invention was close in the flow value to cured bodies of hot-laid asphalt mixtures, hence apparently excellent in flexibility. The cured cement/asphalt body of the invention had a dynamic stability about 10 times that of cured bodies of hot-laid asphalt mixtures, showing stability to traffic load and an outstanding plastic flow resistance.

EXAMPLE 10

The cement/asphalt mixture obtained in the same manner as in Example 8 was actually used for construction of a pavement.

To the surface of concrete pavement was applied a rapid-setting cationic asphalt emulsion (product of Nichireki Chemical Industry Co., Ltd.) in an amount of 0.3 l/m² to form a primer coat thereon. The above cement/asphalt mixture was spread thereover in an amount of about 120 kg/m² with an asphalt finisher, and subjected to rolling for compaction with a roller. The cement/asphalt mixture was supplied by a dump truck to the asphalt finisher as usually done in supply of usual hotlaid asphalt mixtures. The rolling for compaction was conducted with a macadam roller, a tire roller and a tandem roller. The compaction result was satisfactory.

Over the compact surface was spread a mixture of 100 parts of screenings, 1 part of normal Portland cement, 19 parts of cationic asphalt emulsion for slurry seal (product of Nichireki Chemical Industry Co., Ltd.) and 5 parts of water to form a layer of 3-mm thickness. About 1 hour later the road was open to traffic.

Even one month after opening to traffic, the pavement of cured cement/asphalt body retained good conditions free of cracking, rutting due to traffic load, flow, flush of asphalt, etc.

EXAMPLE 11

A pugmill mixer was charged with 100 parts of a coarse-graded aggregate (maximum particle size of up to 25 mm, 3% particles passing through sieve openings of 0.074 mm) comprising a mixture of crushed stone No. 5, No. 6 and No. 7 and screenings and 1 part of ultrahigh-early-strength Portland cement (product of Osaka Cement Co., Ltd.). Mixing continued for about 10 seconds. Ten parts of an asphalt emulsion of the type used in Example 1 was added. The mixture was allowed to coalesce while being mixed for about 2 minutes. Then 5 parts of the ultrahigh-early-strength Portland cement, 1 part of flyash and 0.5 part of water were added. Then mixing continued for about 30 seconds, giving a cement/asphalt mixture.

The thus obtained cement/asphalt mixture was satisfactory in work efficiency, easily transportable on a dump track, easily spreadable with an asphalt finisher and well compacted by rolling with a roller or the like.

EXAMPLE 12

Used as an asphalt emulsion was a quick-curing cationic asphalt emulsion for mixing (penetration of residual asphalt (25° C.)=76 (unit=1/10 mm)) obtained by emulsifying a modified asphalt comprising a mixture of a straight asphalt, 2% of styrene-butadiene block copolymer and 1 % of ethylene-vinyl acetate copolymer based on the straight asphalt.

A pugmill mixer was charged with 100 parts of a dense-graded aggregate of the type used in Example 9 and 1 part of ultrahigh-early-strength Portland cement. Mixing continued for about 10 seconds. Eleven parts of the asphalt emulsion was added and mixing followed for about 20 seconds. The mixing was terminated and the mixture was left to stand to allow the asphalt emulsion to coalesce. About 5 minutes thereafter, the aggregate surface became black and the mixing was resumed when the water was separated. A 5 part quantity of the above ultrahigh-early-strength Portland cement was added and mixing followed for about 40 seconds.

The thus obtained cement/asphalt mixture was satisfactory in work efficiency, easily transportable on a dump track and easily spreadable with an asphalt finisher and compacted by rolling with a roller or the like with good result.

EXAMPLES 13 AND 14

A cement/asphalt mixture was prepared in the same manner as in Example 8 with the exception of using 1.5 parts of normal Portland cement (Example 13) or 2 parts of blast furnace slag cement (Example 14) in place of 1 part of ultrahigh-early-strength Portland cement used as the decomposition accelerator in Example 8.

The resulting cement/asphalt mixture was substantially identical in properties with the mixture obtained in Example 8.

EXAMPLE 15

A pugmill mixer was charged with 100 parts of the same aggregate as used in Example 8 and 1 part of ultrahigh-early-strength Portland cement. After mixing for about 10 seconds, 14 parts of an anionic asphalt emulsion for mixing with dense-graded aggregates (residual asphalt content 59%, penetration of residual asphalt (25° C.)=76 (unit=1/10 mm)) was added and mixing followed for about 20 seconds. The mixing was terminated and the mixture was left to stand to allow the asphalt emulsion to coalesce. About 5 minutes thereafter, the aggregate surface became black due to coating with the asphalt and the mixing was resumed when the water was separated. A 10 part quantity of the above ultrahigh-early-strength Portland cement and 1 part of water were added and mixing continued for about 30 seconds, giving a cement/asphalt mixture according to the present invention.

EXPERIMENTAL EXAMPLE 1

The same procedure as in Example 8 was carried out except that the aggregate was mixed with varied amounts of NaOH (calculated as solids) in place of 1 part of ultrahigh-early-strength Portland cement used as the decomposition accelerator in Example 8. A 14.8 part quantity of the same quick-curing cationic asphalt emulsion for mixing as used in Example 8 was added and mixing continued for about 20 seconds. The mixing was terminated and the mixture was left to stand until the asphalt emulsion thoroughly coalesce. Listed below are the amounts (calculated as solids) of NaOH used per 100 parts of the aggregate and the time lapsed for standing of the asphalt emulsion.

(a) 0.1 part × 10 min.
(b) 0.3 part × 6 min.
(c) 0.5 part × 2 min.
(d) 1.0 part (the asphalt emulsion coalesced on mixing)

While the asphalt emulsion itself coalesced in these runs, the asphalt particles had a brown color and remained unadhering to the aggregate surface.

EXPERIMENTAL EXAMPLE 2

The same procedure as in Example 8 was carried out except that the aggregate was mixed with varied amounts of Ca(OH)$_2$ in place of 1 part of ultrahigh-early-strength Portland cement used as the decomposition accelerator in Example 8. A 14.8 part quantity of the same quick-curing cationic asphalt emulsion for mixing as used in Example 8 was added and mixing continued for about 20 seconds as done in Example 8. The mixing was terminated and the mixture was left to stand until the asphalt emulsion thoroughly coalesced. Listed below are the amounts (calculated as solids) of Ca(OH)$_2$ used per 100 parts of the aggregate and the time lapsed for standing of the asphalt emulsion.

(a) 0.1 part × 10 min.
(b) 0.3 part × 6 min.
(c) 0.5 part × 5 min.
(d) 1.0 part × 2 min.

The asphalt emulsion coalesced in all runs and black asphalt particles adhered to the aggregate surface. Consequently the cement/asphalt mixture of the present invention was obtained by adding a hydraulic inorganic material.

EXPERIMENTAL EXAMPLE 3

The same procedure as in Example 8 was carried out except that the aggregate was mixed with varied amounts of $Al_2(OH)_3$ in place of 1 part of ultrahigh-early-strength Portland cement used as the decomposition accelerator in Example 8. A 14.8 part quantity of the same quick-curing cationic asphalt emulsion for mixing as used in Example 8 was added and mixing continued for about 20 seconds. The mixing was terminated and the mixture was left to stand until complete coalescence of the asphalt emulsion. Listed below are the amounts (calculated as solids) of $Al_2(OH)_3$ used per 100 parts of the aggregate and the time lapsed for standing of the asphalt emulsion.

(a) 0.1 part × 10 min.
(b) 0.3 part × 10 min.
(c) 0.5 part × 10 min.
(d) 1.0 part × 10 min.
(e) 2.0 parts × 10 min.
(f) 4.0 parts × 10 min.

The asphalt emulsion did not coalesce at all in these runs which indicated that $Al_2(OH)_3$ is not useful as a decomposition accelerator.

We claim:

1. A cement/asphalt mixture comprising an aggregate, an asphalt component in an amount of from 2–12 parts by weight of asphalt solids per 100 parts by weight of aggregate, a hydraulic inorganic material in an amount of 1–20 parts by weight per 100 parts by weight of aggregate, and water in an amount sufficient to hydrate the hydraulic material, the mixture characterized in that:

the cement/asphalt mixture being prepared by firstly mixing the aggregate with a cationic or anionic asphalt emulsion to form a mixture and then mixing the resultant mixture with the hydraulic inorganic material;

the surfaces of aggregate fragments are substantially entirely covered with an adherent coating of asphalt formed by the breaking of said asphalt emulsion on contact with the aggregate; and the hydraulic inorganic material and water released from the broken asphalt emulsion are present in the interstices between the aggregate fragments covered with said asphalt coating.

2. A cement/asphalt mixture according to claim 1 wherein said hydraulic inorganic material is present in an amount of 3–18 parts by weight per 100 parts by weight of aggregate.

3. A cement/asphalt mixture according to claim 1 wherein said asphalt solids are present in an amount of 4–10 parts by weight per 100 parts by weight of aggregate.

4. A cement/asphalt mixture according to claim 1 further comprising 0.1–6 parts by weight per 100 parts by weight of aggregate of an alkaline compound of a bivalent metal.

5. A cement/asphalt mixture according to claim 1 wherein said asphalt solids are present in an amount of 4–10 parts by weight per 100 parts by weight of aggregate.

6. A cement/asphalt mixture according to claim 4 wherein said hydraulic material is present in an amount of 3–18 parts by weight per 100 parts by weight of aggregate.

7. A cement/asphalt mixture according to claim 4 wherein said alkaline compound comprises an oxide or hydroxide.

8. A cement/asphalt mixture according to claim 4 wherein said alkaline compound comprises cement.

9. A process of preparing a cement/asphalt mixture comprising:
a) mixing an aggregate and an aqueous cationic or anionic asphalt emulsion in an amount of 2–12 parts by weight per 100 parts by weight of aggregate, said mixing being effected for a time sufficient to break said emulsion whereby the surfaces of the aggregate fragments are substantially entirely covered with an adherent coating of asphalt from the broken emulsion and whereby water is released from the broken asphalt emulsion; and
b) mixing hydraulic inorganic material with the mixture resulting from step (a) for a time sufficient to provide the hydraulic inorganic material and the water released from the broken emulsion in the interstices between the aggregate fragments covered with said asphalt coating.

10. A process according to claim 9 wherein, in step (b), said hydraulic inorganic material is present in an amount of 1–20 parts by weight per 100 parts by weight of aggregate.

11. A process according to claim 10 wherein said emulsion is present in an amount of 4–10 parts by weight per 100 part by weight of aggregate.

12. A process according to claim 10 wherein said hydraulic inorganic material is present in an amount of 3–18 parts by weight per 100 parts by weight of aggregate.

13. A process according to claim 9 wherein, in step (a), said aggregate and emulsion are mixed with 0.1–6 parts by weight per 100 parts by weight of aggregate, of an alkaline compound of a bivalent metal.

14. A process according to claim 13 wherein, in step (b), said hydraulic material is present in an amount of 1–20 parts by weight per 100 parts by weight of aggregate.

15. A process according to claim 14 wherein said hydraulic material is present in an amount of 3–18 parts by weight per 100 parts by weight of aggregate.

16. A process according to claim 13 wherein said emulsion is present in an amount of 4–10 parts by weight per 100 parts by weight of aggregate.

17. A process according to claim 13 wherein said alkaline compound comprises an oxide or hydroxide.

18. A process according to claim 13 wherein said alkaline compound comprises cement.

19. A process according to claim 9 further comprising applying a layer of the mixture resulting from step (b) to a surface, and curing the cement to provide a cured cement/asphalt layer on said surface.

20. A process according to claim 19 wherein said cured layer comprises a road surface.

* * * * *